(12) United States Patent
Fedronic et al.

(10) Patent No.: US 9,112,679 B2
(45) Date of Patent: *Aug. 18, 2015

(54) STORING A KEY IN A REMOTE SECURITY MODULE

(71) Applicant: Assa Abloy AB, Stockholm (SE)

(72) Inventors: Dominique Fedronic, Belmont, CA (US); Eric Le Saint, Los Altos, CA (US); John Babbidge, Alameda, CA (US); Hong Liu, Singapore (SG)

(73) Assignee: Assa Abloy AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/948,286

(22) Filed: Jul. 23, 2013

(65) Prior Publication Data
US 2014/0095879 A1   Apr. 3, 2014

Related U.S. Application Data

(63) Continuation of application No. 12/282,782, filed as application No. PCT/IB2007/000681 on Mar. 15, 2007, now Pat. No. 8,522,014.

(60) Provisional application No. 60/782,292, filed on Mar. 15, 2006, provisional application No. 60/784,757, filed on Mar. 23, 2006.

(51) Int. Cl.
*H04L 9/08* (2006.01)
*G06F 21/57* (2013.01)
*G06F 21/60* (2013.01)

(52) U.S. Cl.
CPC ............ *H04L 9/0825* (2013.01); *G06F 21/602* (2013.01); *G06F 21/606* (2013.01)

(58) Field of Classification Search
CPC ........................... G06F 21/602; H04L 9/0825
See application file for complete search history.

(56) References Cited

U.S. PATENT DOCUMENTS

| 6,278,782 | B1 * | 8/2001 | Ober et al. | 380/264 |
|---|---|---|---|---|
| 6,799,273 | B1 * | 9/2004 | Oishi et al. | 713/171 |
| 6,999,948 | B1 * | 2/2006 | Hatanaka et al. | 705/65 |
| 7,567,674 | B2 * | 7/2009 | Nishimoto et al. | 380/281 |
| 7,636,691 | B2 * | 12/2009 | Maari | 705/51 |
| 7,841,014 | B2 * | 11/2010 | Sato et al. | 726/29 |
| 2003/0026427 | A1 * | 2/2003 | Couillard | 380/277 |

* cited by examiner

*Primary Examiner* — Dede Zecher
*Assistant Examiner* — Trang Doan
(74) *Attorney, Agent, or Firm* — Muirhead and Saturnelli, LLC

(57) ABSTRACT

A system obtains assurance by a content provider that a content control key is securely stored in a remote security module for further secure communications between the content provider and the security module. A security module manufacturer, which has a pre-established trustful relation with the security module, imports a symmetric transport key into the security module. The symmetric transport key is unique to the security module. The content provider shares the symmetric transport key with the security module manufacturer. The content provider exchanging messages with the security module through a security module communication manager in order to get the proof that the security module stores the content control key. At least a portion of the messages exchanged between the content provider and the security module are protected using the symmetric transport key. The symmetric transport key is independent of said content control key.

11 Claims, 9 Drawing Sheets

STORING A KEY IN A REMOTE SECURITY MODULE

This application is a continuation of U.S. application Ser. No. 12/282,782 filed Sep. 28, 2009 (now U.S. Pat. No. 8,522, 014), which is a 371 national phase of PCT application PCT/IB2007/000681 filed Mar. 15, 2007, which claims priority to U.S. Provisional No. 60/782,292 filed Mar. 15, 2006 and U.S. Provisional 60/784,757 filed Mar. 23, 2006, which are hereby incorporated by reference.

FIELD OF THE INVENTION

The present invention relates to a method for obtaining assurance that a content control key is securely stored in a remote security module for further secure communications between a content provider and said security module, and to a corresponding system.

The security module may be a multi-organization security module with cryptographic capability, a smart card, a security token, etc.

BACKGROUND OF THE RELATED ART

Current security module content management models require a content provider to trust the parties involved in the production, issuance, management, content delivery, and usage of a security module before communicating content with the security module. Additionally, the content provider must trust that the end-to-end communication with the security module is never transmitted to a security module production entity having security module keys, since this could lead to the disclosure of content provider keys and the content they protect. Also, the content provider must trust that third parties having security module keys do not misuse or disclose their keys. These trust requirements exist regardless of whether the content provider is directly delivering content to the security module and whether the content is delivered in real-time to the security module.

A content provider must trust a security module manufacturer or issuer to protect and not misuse, substitute, or disclose to other parties the content provider's transport keys. Also, the content provider must trust the security module manufacturer or issuer to load the content provider's keys on the intended security modules with the intended configuration.

If a third party authority (e.g., multiple operating system key management authority (MULTOS KMA)) delivers some content provider key material to the security module manufacturer or issuer, then the content provider must fully trust the third party authority to distribute the correct key material and derivatives.

The content provider must also trust the security module manufacturer or issuer to not misuse or substitute the distributed key material. If any party fails to enforce its responsibility, then the content provider will not derive the benefit expected from the security module and will not be aware of a security incident that may occur.

In addition to the above trust issues, there are specific weaknesses in the current device content management models that put the security of the content provider service at risk, particularly when the content provider does not have direct access to or full control of the communication channels transporting content to or from a security module. For example, with security modules equipped with GlobalPlatform, a content provider does gain cryptographic control over a security domain when importing a wrapped security domain key set that it exclusively owns, using an initial domain key set. The initial domain key set is shared by the content provider and a third party having prior access to the security module for the purpose of installing the initial key set.

The content provider then deletes the initial key set. This is called a security domain possession operation. However, when the content provider does not have direct access to the security module, then the GlobalPlatform key exchange protocols do not protect the content provider from a traitor or negligence from the parties having direct access to the communications including the wrapped content provider key set. Specifically, the content provider key set can be obtained in plain text form by processing the communication logs including the wrapped keys (and secure channel establishment protocol) with a p11 hardware security module (HSM) hosting the shared initial key set.

In another example, with security devices equipped with MULTOS, the need to trust a third party is even more explicit since the content provider entirely relies on the key management authority (KMA) and issuer to provide content loading certificates. In addition to the trust requirement on the KMA, if any party employee or facility is at risk, the content provider assets are at risk.

In addition to the above mentioned issues, when a content provider, which has no direct access to a security module, wants to obtain assurance that a unique private asymmetric key or secret symmetric key is located on the security module and can be used to secure further communications between the content provider and the secure module, the key should never be accessible from other organizations with other keys on the security module, such as security module manufacturers or service bureaus. In particular such other organizations should not be able to process communication logs with their own cryptographic material and discover the key. But the content provider does not produce the final protected security module commands, and relies on another entity to establish the logical communication and forward the content to the security module and corresponding responses from the security module. It has no other means than submitting content and receiving security module responses to verify that the security module is genuine.

SUMMARY OF THE INVENTION

An object of the present invention is to overcome the above-described issues and limitations of the related art.

Another object of the invention is to provide a method and system to import a content provider domain key into a security module in such a way that the content provider organization only requires limited trust in the other parties involved in the production and administration of the security module.

These and other objects of the invention may be achieved in whole or in part by a method for obtaining assurance by a content provider that a content control key is securely stored in a remote security module for further secure communications between said content provider and said security module, the method comprising:

a security module manufacturer, which has a pre-established trustful relation with said security module, importing a symmetric transport key into said security module, wherein said symmetric transport key is unique to said security module;

said content provider sharing said symmetric transport key with said security module manufacturer; and said content provider exchanging messages with said security module through a security module communication manager in order to get the proof that said security module stores said content control key;

wherein at least a portion of said messages exchanged between said content provider and said security module are protected using said symmetric transport key.

The objects of the invention may be further achieved in whole or in part by a system for obtaining assurance by a content provider that a content control key is securely stored in a remote security module for further secure communications between said content provider and said security module, the system comprising:
said content provider;
said security module;
a security module communication manager; and
a security module manufacturer, which has a pre-established trustful relation with said security module and an interface for importing a symmetric transport key into said security module, wherein said symmetric transport key is unique to said security module, said security module manufacturer sharing said symmetric transport key with said content provider;
wherein:
said content provider and said security module are functionally connected for exchanging messages through a security module communication manager in order to get the proof that said security module stores said content control key; and
said content provider and said security module are designed for protecting at least a portion of said messages exchanged between said content provider and said security module using said symmetric transport key.

BRIEF DESCRIPTION OF THE DRAWINGS

Preferred embodiments of the present invention will now be further described in the following paragraphs of the specification and may be better understood when read in conjunction with the attached drawings, in which.

DETAILED DESCRIPTION OF THE INVENTION

Figure 1:
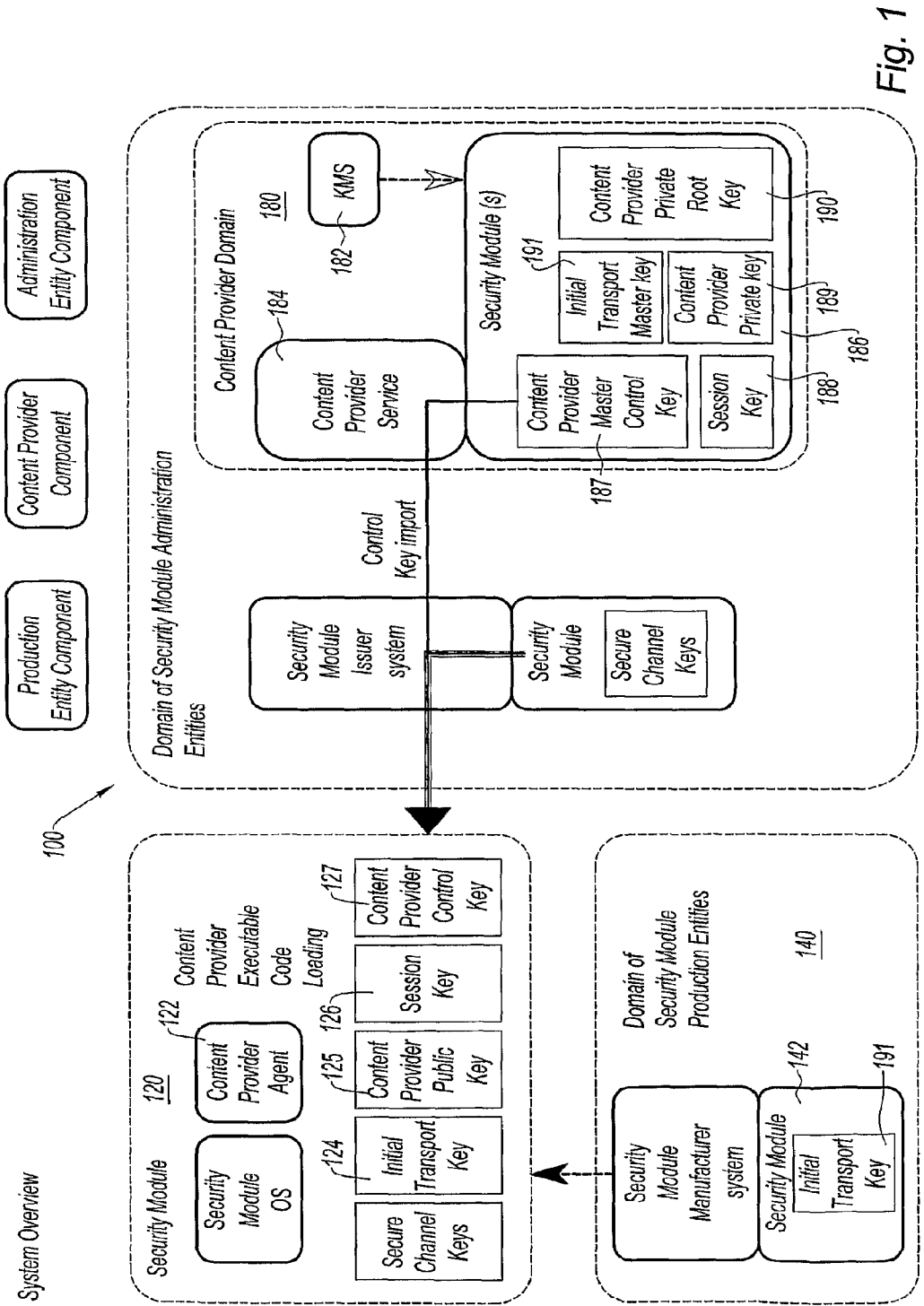
FIG. 1 illustrates a system of the invention.

For the purpose of describing the invention, two categories of entities or organizations involved in the life cycle of a security module are identified. These are production entities and administration entities. Production entities have direct or indirect access to the security module from the beginning of the life cycle until the production shipment and have no further access during the remainder of the life cycle of the module. Some examples of production entities are a chip manufacturer, token manufacturer, card manufacturer, and card production bureau.

Administration entities have direct or indirect access to the security module during the remaining life cycle of the security module, once deployed (i.e., following the production shipment). Examples of administration entities are a card issuer, content delivery provider, card holder, post-issuance administrator, and content provider.

As described herein, production entities do not have real-time access to communication channels between administration entities and the security module and, therefore, cannot misuse or attack that access. Administration entities do not have real-time access to communications between production entities and the security module. Production and administration entities never exchange their hardware security modules (HSMs) nor their plain text keys. The content provider trusts the security module integrity and the content provider agent located in the security module.

According to one embodiment of the invention, the content provider shares a secret or initial key with a production entity. This secret or initial key is placed on the security module by the production entity. The content provider uses the secret or initial key to securely replace the key with its own control secret or key using an innovative protocol. This process allows the content provider to protect, end-to-end, its transported content or keys from risks related to the misuse or theft of production entity keys.

When the content provider does not have direct access to the security module, the content provider may rely on an administration entity to safely deliver content to the security module, without trust requirements on that entity or the systems it operates. There is no risk of disclosing content or content provider keys to the administration entity even if the administration entity misuses or communicates its own keys to unauthorized entities. As a result, it is difficult for any third party to discover what the on-device content provider secret is, even when collaborating with other third parties. The content provider can leverage its one device secret or key to further secure, end-to-end, all its communications with the card in both directions.

The invention can be applied to securely load and manage content on a security module, such as:
public key infrastructure (PKI) key material (private keys, etc.) from a certification authority (CA) to a security module;
symmetric key material from a one-time password (OTP) facility to a security module;
biometric data or private identity attributes from an identity management system (IDMS) to a security module;
private medical data from a health care provider;
digital rights from a content provider; and
electronic money, credit values, or other privileges from a bank to a security module.

The control key establishment protocol and further protected content delivery may be operated in multiple arrangements. For example, secure real-time delivery of a content provider control key to a smart card through a content delivery provider may be achieved when the content provider does not have access to the card. Off-line secure content delivery of a content provider control key to a security module may be achieved by use of e-mails sent to a cardholder, which the cardholder then locally pushes to his smart card.

FIG. 1 illustrates a system of the invention. System 100 includes:

A key management system (KMS) 182 belonging to a content provider 180 capable of generating and protecting symmetric and asymmetric key pairs in HSMs or other cryptographic modules;

a content provider service 184 capable of emitting or receiving content cryptographically protected with content provider keys. The service 184 may not be capable of and is not required to communicate directly with a security module 120. The content provider service 184 may not actually produce the content, but handles the protected content that is communicated to the security module 120;

A cryptographic module or HSM {hereafter also referred to as a security module (SM)} 186 accessible from the content provider service 184 and including keys 187-191 generated or exchanged with the content provider KMS 182;

A security module 120 with symmetric and asymmetric cryptographic capabilities having volatile and persistent memory and optionally permanent memory. Each instance of the security module 120 holds a unique identifier or diversification data. The security module 120 can import a content provider's executable code. The security module 120 provides functionality allowing the content provider domain 180 to trust the integrity of its executable code. For instance, a method such as GlobalPlatform Mandated data authentication pattern (DAP), where the content provider signs the executable code, can be used by the content provider to enforce executable code integrity.

The content provider executable code can be instantiated into a content provider executable process on the security module 120 as a content provider agent 122.

A number of additional subsystems are necessary for the security module production and administration, as described in the above categories. Where the content provider does not have direct access to the security module 120, an administrative entity 160 can forward the secured content provider data to the security module 120 without the ability to examine the data.

The above-described system operates as follows:

The KMS 182 generates an initial master transport key 191 in the content provider service security module (SM) 186 and securely distributes it to a production entity 140. Alternatively, the production entity 140 may generate the initial master key 191 and deliver it securely to the content provider service SM 186 through the content provider KMS 182. The initial master transport key 191 must not be distributed to an administration entity 160 such as a content delivery entity. The key exchange relies on key agreement protocols described in (SP800-56), or any other key exchange protocol, such as a Key Ceremony.

The content provider KMS 182 generates, once, a symmetric master content provider control key 187 in the content provider service SM 186 to later produce a unique derived content provider control key 127 for each security module 120. Alternatively, the control provider service SM 186 may generate an asymmetric key pair, of which a private key of the pair is used as a control key for each security module 120.

The production entity 140 derives the initial master transport key 191 using security module diversification data. The production entity then imports the resulting initial transport key 191 into a security module 142 so the content provider agent 122 can access it to further decrypt cryptograms received from the content provider. For instance this key may be a GlobalPlatform Security Domain key encryption key (KEK) or data encryption key when the content provider agent 122 is a GlobalPlatform applet in a GlobalPlatform security domain.

A production or administration party loads the content provider executable code on the security module 120 with the approval of the content provider. For instance, GlobalPlatform provides a mandated DAP functionality, which can be used for that purpose. When the content provider is not accessing the security module 120 directly, it must rely on a third party having the privilege to load the content provider executable code:

The content provider signs the code with a GlobalPlatform (GP) mandated DAP private key. The security module production entity instantiates the GP Mandated DAP security domain and loads the GP Mandated DAP public key obtained from the content provider. The GP Mandated DAP keys and GP security domain cannot be altered thereafter.

The card issuer or other administration entity loads the module code. The GP Mandated DAP security domain verifies the DAP signature.

A content provider agent 122 is instantiated from the content provider executable code.

A content provider public key 125 is securely loaded on the security module 120 at a location where it is accessible from the content provider agent 122 for verification of cryptograms signed with the corresponding private key operated in the SM 186 of the content provider service 184.

With one method, the content provider service wraps the public key with the initial transport key. An administrative entity (for instance the issuer) then imports the resulting cryptogram using a secure channel or secure process controlled by that entity.

Another method assumes that the content provider agent 122 code includes a root public key of the content provider. The actual content provider public key intended for import is signed by the root private key, and the signed content public key (or certificate) can be imported to the security module, if the root key signature is verified.

In a last method, the content provider public key or root public key is set by the production entity as part of the security module permanent memory (e.g., ROM). The Content Provider must then be able to check—or sign—the configuration of the permanent memory.

Upon request from an administration entity, the content provider agent 122 generates a transport session key (on-device) 126, optionally appends or combines it with the security module identifier or diversification data, and wraps the resulting data with the content provider public key. Then the content provider agent 122 sends it back to the content provider service 184.

The content provider service SM 186 then either derives a symmetric content provider control key 187 or generates an asymmetric content provider control key 187.

The content provider service SM 186 wraps the content provider control key 187 with the transport session key 188, and wraps again the resulting cryptogram with the initial card content transport key 191 forming a cryptogram X. The content provider service 184 sends the resulting cryptogram X to an administration entity system (for instance the issuer) 160 able to communicate with the security module 120 and the content provider agent 122 in the security module 120. Usage of a secure channel is recommended to import the cryptogram X to the content provider agent 122.

The security module 120 unwraps the cryptogram on-device with the card content transport key 124, and passes the resulting cryptogram to the content provider agent 122.

The content provider agent 122 unwraps the resulting cryptogram and obtains the content provider control key 127 that can be operated safely to generate further keys and exchange and protect content transmitted between the content provider service 184 and the content provider agent 122.

In the following discussion of the invention, the notation X(Y) will generally be used to indicate that a key X has been used to wrap (i.e., encrypt) some type of information Y. Accordingly, X(Y) represents the encrypted form of information Y.

Figure 2:
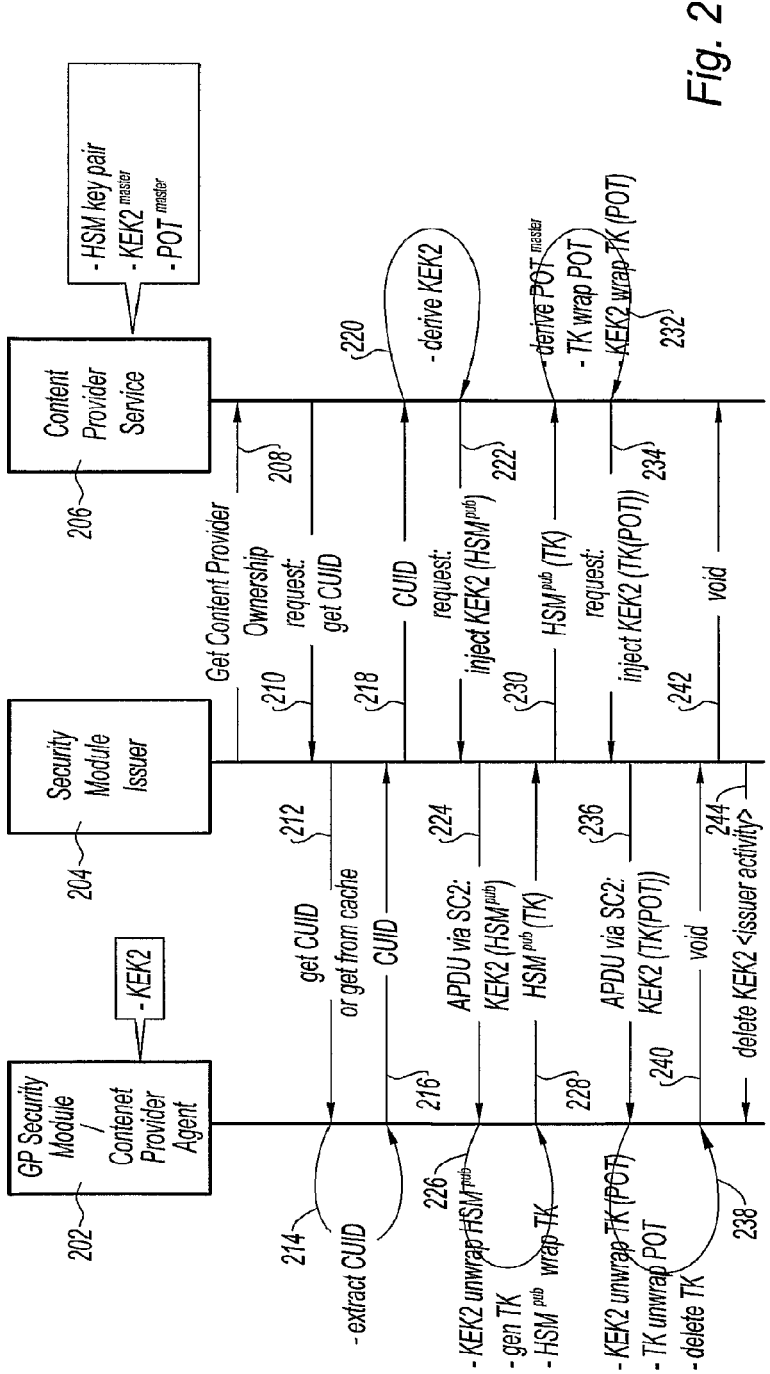
FIG. 2 illustrates a communication protocol for transferring a content provider master key from a content provider service to a GlobalPlatform security module through a security module issuer.

FIG. 2 illustrates a communication protocol for transferring a content provider master key (designated as POT) from a content provider service 206 to a Global Platform (GP) security module 202 through a security module issuer 204. Initially, security module issuer 204 sends a Get Content Provider Ownership message 208 to content provider service 206. In response, content provider service 206 issues a Request: Get CUID message 210 to security module issuer 204 requesting security module issuer 204 to get a card unique identification (CUID) from GP security module 202. Then, security module issuer 204 sends a Get CUID message 212 to GP security module 202, which extracts 214 its CUID and sends the extracted CUID to security module issuer 204 in a CUID message 216. As an alternative to obtaining the CUID from GP security module 202, security module issuer 204 may obtain the CUID from a cache. Upon obtaining the CUID from GP security module 202 or from cache, security module issuer 204 sends the obtained CUID to content provider service 206 in a CUID message 218.

Content provider service 206 derives 220 the appropriate content provider transport key encryption key (KEK2) for GP security module 202 from the received CUID. Thereafter, content provider service 206 sends, to security module issuer 204, a Request: Inject KEK2(HSM$^{pub}$) message 222, which contains a content provider root public key (designated as HSM$^{pub}$) wrapped (i.e., encrypted) with KEK2. Security module issuer 204 sends an application protocol data unit (APDU) message 224 containing the received KEK2 (HSM$^{pub}$) through a secure channel (designated as SC2) to GP security module 202. In process 226, GP security module 202 unwraps (i.e., decrypts) the received KEK2(HSM$^{pub}$) with its own copy of KEK2 to obtain HSM$^{pub}$, generates a session transport key (TK) with its content provider agent, and wraps the generated TK with HSM$^{pub}$. Gp security module 202 sends the wrapped session key, HSM$^{pub}$(TK), in a message 228 to security module issuer 204, which conveys the wrapped session key to content provider service 206 in a message 230. Content provider service 206 unwraps the received HSM$^{pub}$(TK) using its own copy of HSM$^{pub}$ to obtain the decrypted TK.

In process 232, content provider service 206 derives the content provider master key, POT, wraps POT with the decrypted TK to produce TK(POT), and wraps TK(POT) with KEK2 to produce KEK2(TK(POT)). Content provider service 206 sends a Request: Inject KEK2(TK(POT)) message 234 containing KEK2(TK(POT)) to security module issuer 204, which conveys the received KEK2(TK(POT)) to GP security module 202 in an APDU message 236 via SC2.

In process 238, GP security module 202 uses its copy of KEK2 to unwrap the received KEK2(TK(POT)) to produce TK(POT), uses the TK it generated previously to unwrap TK(POT) to obtain POT, and deletes the generated TK from its memory. GP security module 202 sends a Void message 240 to security module 204, which conveys a Void message 242, in response thereto, to content provider service 206 and responds to GP security module 202 with a Delete KEK2 message 244. Gp security module 202 deletes KEK2 upon receiving message 244 and retains the decrypted. POT received from content provider service 206 via security module issuer 204.

Figure 3:
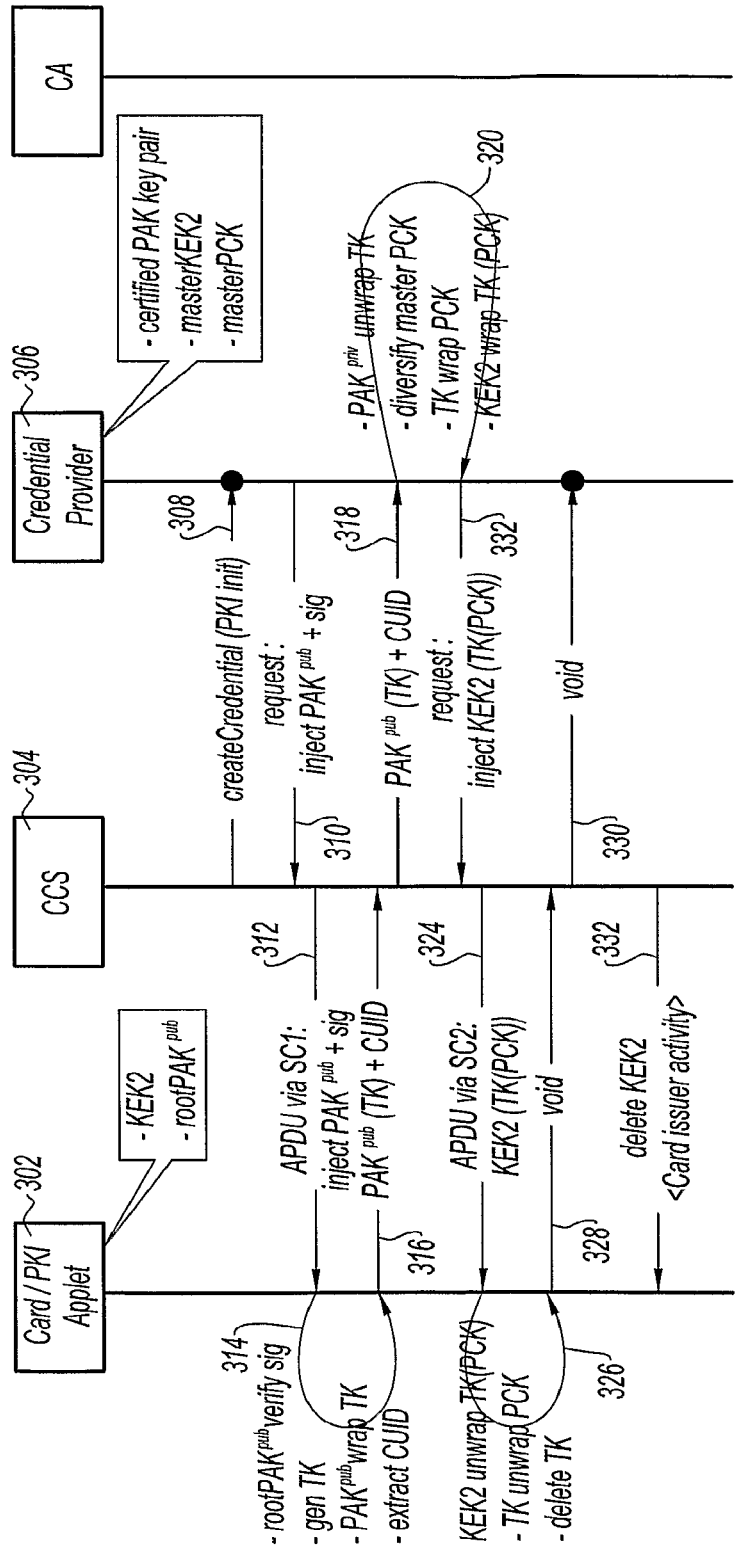
FIG. 3 illustrates a communication protocol for transferring a provider credential key from a credential provider to a public key infrastructure applet through a CCS.

FIG. 3 illustrates a communication protocol for transferring a provider credential key (PCK) from a credential provider 306 to a public key infrastructure (PKI) applet 302 through a CCS 304. Initially, CCS 304 sends a Create Credential (PKI Init) message 308 to credential provider 306. In response, credential provider 306 issues a Request: Inject PAK$^{pub}$+Sig message 310 to CCS 304 containing a public provider AuthC key (PAK), of an asymmetric key pair, and a digital signature (designated as Sig) of credential provider 306. CCS 304 sends an application protocol data unit (APDU) message 312 containing the received Inject PAK$^{pub}$+Sig through a secure channel (designated as SC1) to PKI applet 302.

In process 314, PKI applet 302 uses a stored rootPAK$^{pub}$ key to verify the signature, Sig, accompanying the received PAK$^{pub}$, generates a session transport key (TK) if the signature is valid, wraps the generated TK with the received PAK$^{pub}$, and extracts a card unique identification (CUID). PKI applet 302 sends the wrapped session key, PAK$^{pub}$(TK), with the CUID in a message 316 to CCS 304, which conveys the wrapped session key and accompanying CUID to credential provider 306 in a message 318.

In process 320, credential provider 306 unwraps the received PAK$^{pub}$(TK) using a private PAK key, PAK$^{priv}$, of the asymmetric key pair to obtain the decrypted TK, diversifies a stored copy of a master PCK key, masterPCK, wraps PCK with the decrypted TK to produce TK(PCK), and wraps TK(PCK) with a stored master key encryption key (designated as KEK2) to produce KEK2(TK(PCK)). Credential provider 306 sends a Request: Inject KEK2(TK(PCK)) message 322 containing the doubly wrapped KEK2(TK(PCK)) to CCS 304, which conveys KEK2(TK(PCK)) to PKI applet 302 in an APDU message 324 via a secure channel, SC2.

In process 326, PKI applet 302 uses its copy of KEK2 to unwrap the received KEK2(TK(PCK)) and produce the decrypted TK(PCK), uses the TK it generated previously to unwrap the decrypted TK(PCK) to obtain the decrypted PCK, and deletes the generated TK from its memory. PKI applet 302 sends a Void message 328 to security module 204, which conveys a Void message 330, in response thereto, to credential provider 306 and responds to PKI applet 302 with a Delete KEK2 message 332. PKI applet 302 deletes KEK2 upon receiving message 332 and retains the decrypted PCK received from credential provider 306 via CCS 304.

Figure 4:
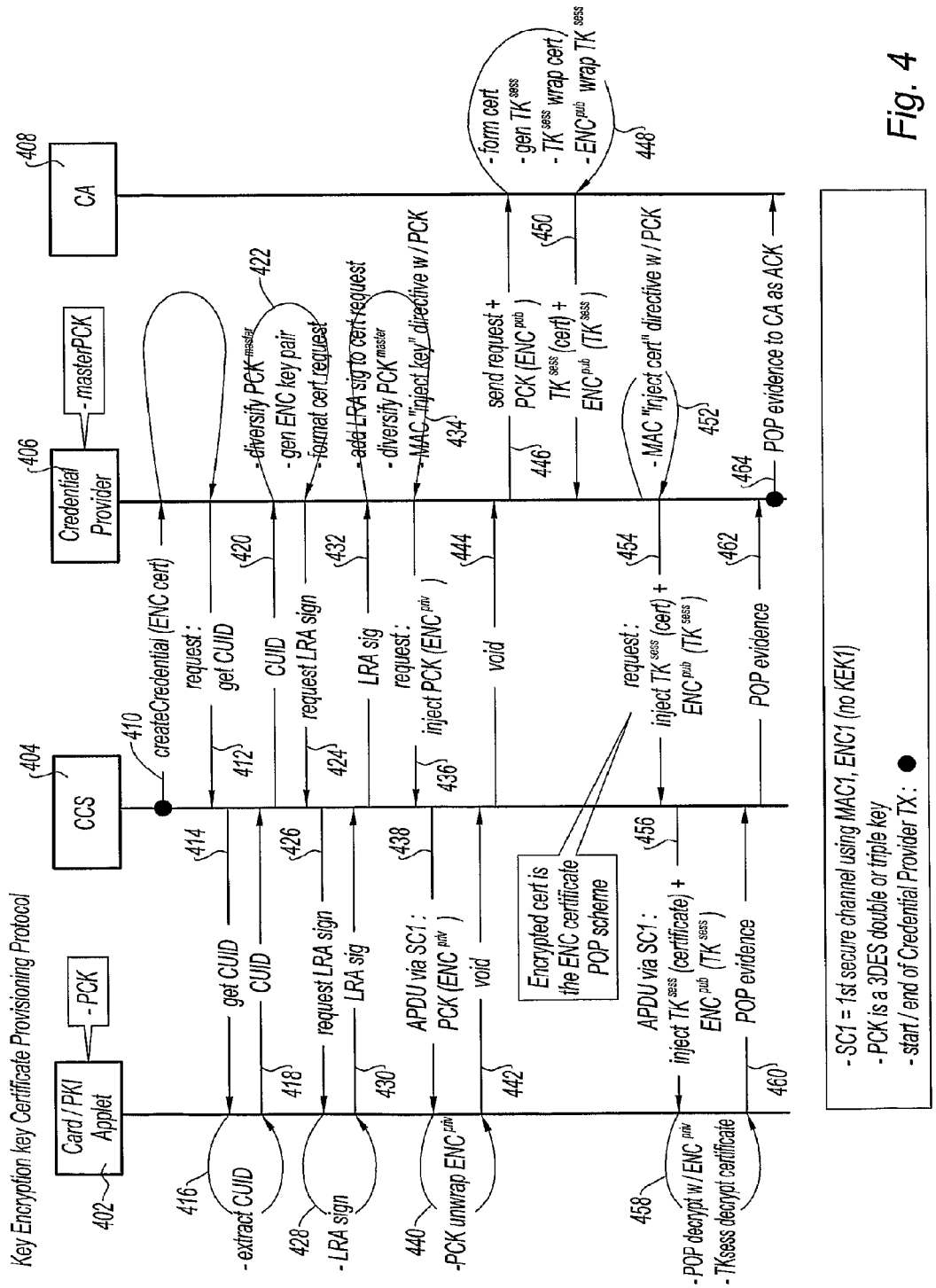
FIG. 4 illustrates a communication protocol for transferring a certificate from a certification authority to a public key infrastructure applet through a credential provider and a CCS.

FIG. 4 illustrates a communication protocol for transferring a certificate (designated as Cert) from a certification authority (CA) 408 to a public key infrastructure (PKI) applet 402 through a credential provider 406 and a CCS 404. Initially, CCS 404 sends a Create Credential (ENC Cert) message 410 to credential provider 406. In response, credential provider 406 issues a Request: Get CUID message 412 to CCS 404 requesting CCS 404 to get a card unique identification (CUID) from PKI applet 402. Then, CCS 404 sends a Get CUID message 414 to PKI applet 402, which extracts 416 its CUID and sends the extracted CUID to CCS 404 in a CUID message 418. CCS 404 sends the received CUID to credential provider 406 in a CUID message 420.

In process 422, credential provider 406 diversifies a stored master provider credential key (PCK), $pCK^{master}$, generates an asymmetric encryption (ENC) key pair, and formats a certificate request. Thereafter, credential provider 406 sends to CCS 404 a Request LRA Signature message 424, which CCS 404 conveys to PKI applet 402 in a message 426. In response, PKI applet obtains its local registration authority (LRA) Signature 428 and sends the signature in an LRA Sig message 430 to CCS 404, which passes the LRA Sig to credential provider in message 432.

In process 434, credential provider 406 adds the received LRA signature, LRA Sig, to a certificate request, diversifies $PCK^{master}$, creates a MAC Inject Key Directive With PCK, and wraps a private key, $ENC^{priv}$, of the previously generated ENC key pair with PCK to produce $PCK(ENC^{priv})$. Credential Provider 406 sends a Request: Inject $PCK(ENC^{priv})$ message 436 to CCS 404. CCS 404 sends an application protocol data unit (APDU) message 438 containing the received PCK ($ENC^{priv}$) through a secure channel (designated as SC1) to PKI applet 402.

PKI applet 402 unwraps (i.e., decrypts) 440 the received $PCK(ENC^{priv})$ with its own copy of PCK to obtain the decrypted $ENC^{priv}$ and sends a Void message 442 to CCS 404, which then conveys Void message 444 to credential provider 406. Upon receiving Void message 444, credential provider 406 sends a Cert Request+Wrapped $ENC^{pub}$ message 446 to CA 408.

In process 448, CA 408 forms a Cart, unwraps the received wrapped $ENC^{pub}$, generates a session transport key ($TK^{sess}$), wraps Cert with $TK^{sess}$ to produce $TK^{sess}(Cert)$, and wraps $TK^{sess}$ with $ENC^{pub}$ to produce $ENC^{pub}(TK^{sess})$. CA 408 sends $TK^{sess}(Cert)$ and $ENC^{pub}(TK^{sess})$ in a message 450 to credential provider 406. Credential provider 406 creates a MAC Inject Cert Directive With PCK 452 and sends a Request: Inject $TK^{sess}(Cert)+ENC^{pub}(TK^{sess})$ message 454 containing the received $TK^{sess}(Cert)$ and $ENC^{pub}(TK^{sess})$ to CCS 404. CCS 404 sends an APDU message 456 containing the received $TK^{sess}(Cert)$ and $ENC^{pub}(TK^{sess})$ through SC1 to PKI applet 402.

In process 458, PKI applet POP decrypts the received $ENC^{pub}(TK^{sess})$ with the $ENC^{priv}$ key it received previously to obtain $TK^{sess}$ and decrypts the received $TK^{sess}(Cert)$ with the unwrapped $TK^{sess}$ to obtain Cert. Then, PKI applet 402 sends a POP Evidence message 460 to CCS 404, which then conveys a POP Evidence message 462 to credential provider 406. Thereafter, credential provider 406 sends a POP Evidence message 464 to CA 408 as an acknowledgment message that PKI applet 402 has received the certificate.

Figure 5:
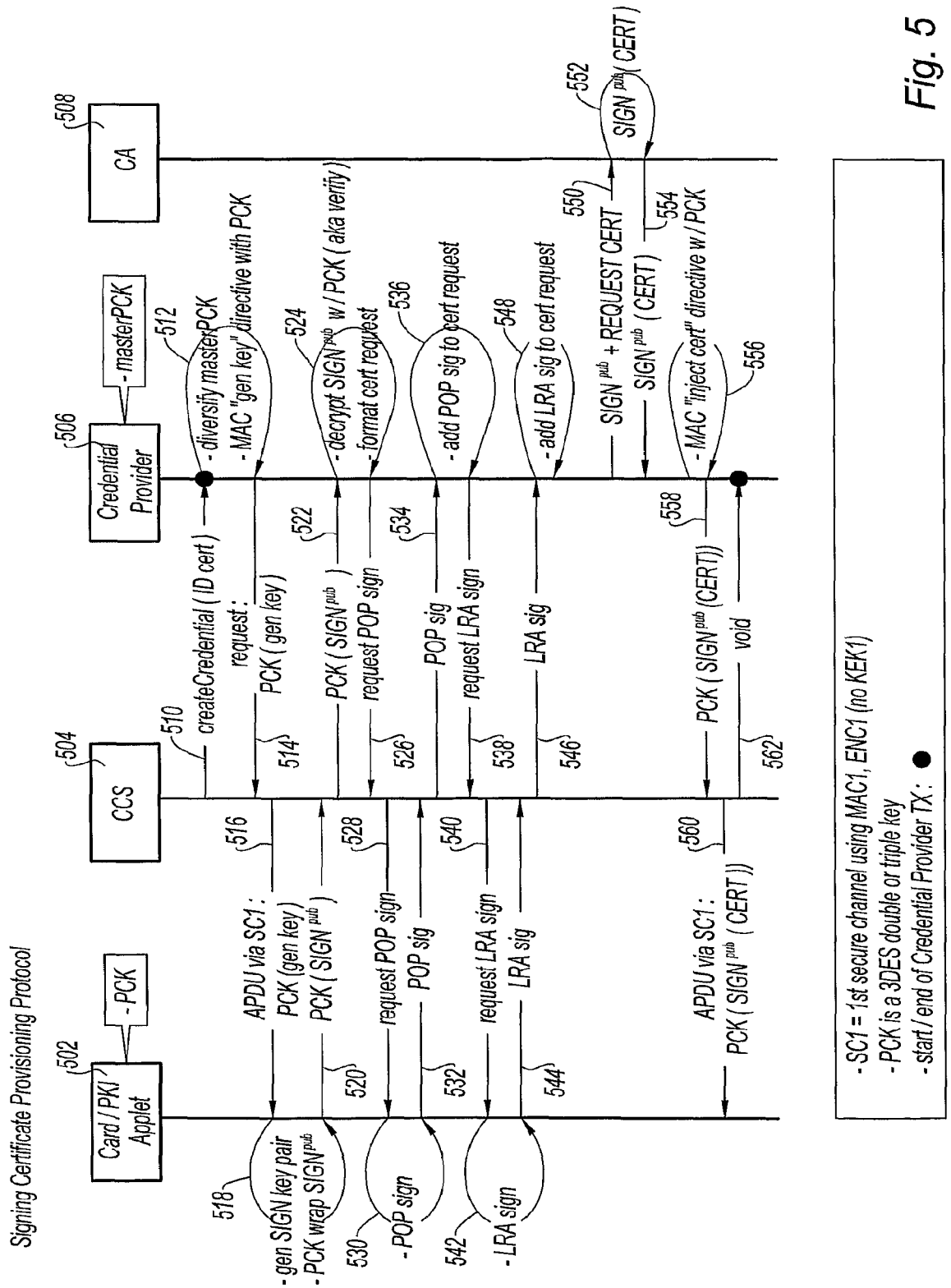
FIG. 5 illustrates a communication protocol for transferring a certificate certification authority to a public key infrastructure applet through a credential provider and a CCS.

FIG. 5 illustrates a communication protocol for transferring a certificate (designated as Cert) from a certification authority (CA) 508 to a public key infrastructure (PKI) applet 502 through a credential provider 506 and a CCS 504. Initially, CCS 504 sends a Create Credential (ID Cert) message 510 to credential provider 506.

In response 512, credential provider 506 diversifies a stored master provider credential key (masterPCK), creates a MAC Gen Key Directive, and wraps the Gen Key directive with PCK to produce PCK(Gen Key). Credential Provider 506 issues a Request: PCK(Gen Key) message 514 containing PCK(Gen Key) to CCS 504. CCS 504 sends an application protocol data unit (APDU) message 516 containing the received PCK(Gen Key) through a secure channel (designated as SC1) to PKI applet 502.

In process 518, PKI applet 502 unwraps the received PCK (Gen Key) with its own copy of PCK, generates a signing (designated SIGN) key pair, and wraps a public key, $SIGN^{pub}$, of the SIGN key pair with PCK to produce $PCK(SIGN^{pub})$. PKI applet 502 sends $PCK(SIGN^{pub})$ to CCS 504 in a PCK ($SIGN^{pub}$) message 520, and CCS 504 conveys $PCK(SIGN^{pub})$ to credential provider 506 in a $PCK(SIGN^{pub})$ message 522.

In process 524, credential provider 506 unwraps the received $PCK(SIGN^{pub})$ with its own PCK and formats a certificate (Cert) request. Thereafter, credential provider 506 sends a Request POP Sign message 526 to CCS 504, which then sends a Request POP Sign message 528 to PKI applet 502. PKI applet 502 provides 530 the requested POP Sig in a POP Sig message 532 to CCS 504, which passes POP Sig in a POP Sig message 534 to credential provider 506. Credential provider 506 adds 536 the received POP Sig to a certificate request.

Credential provider 506 sends a Request LRA Sign message 538 to CCS 504. CCS 504 then sends a Request LRA Sign message 540 to PKI applet 502. PKI applet 502 obtains 542 the requested local registration authority (LRA) Sig and provides this information in an LRA Sig message 544 to CCS 504, which conveys the received LRA Sig to credential provider 506 in an LRA Sig message 546. Credential provider 506 adds 548 the received LRA Sig to the certificate request.

Credential provider 506 issues to CA 508 a Send Request message 550 containing the decrypted $SIGN^{pub}$ and a certificate request. In process 552, CA 508 forms a signing certificate (designated as SIGN Cert), encrypts Sign Cert with the received $SIGN^{pub}$ to produce $SIGN^{pub}(Cert)$, and sends $SIGN^{pub}(Cert)$ to credential provider 506 in a SIGN Cert message 554. Upon receiving $SIGN^{pub}(Cert)$, credential provider 506 creates 556 a MAC Inject. Cert Directive by wrapping the received $SIGN^{pub}(Cert)$ with its copy of PCK to create $PCK(SIGN^{pub}(Cert))$.

Credential provider sends the created $PCK(SIGN^{pub}(Cert))$ in a message 558 to CCS 504. CCS sends an application protocol data unit (APDU) message 560 containing the received $PCK(SIGN^{pub}(Cert))$ through SC1 to PKI applet 502 and sends a Void message 562 to credential provider 506. PKI applet 502 unwraps the received $PCK(SIGN^{pub}(Cert))$ with its copy of PCK to obtain $SIGN^{pub}(Cert)$ and unwraps the decrypted $SIGN^{pub}(Cert)$ with the private SIGN key, $SIGN^{priv}$, of the generated SIGN key pair to obtain the decrypted Cert.

Figure 6:
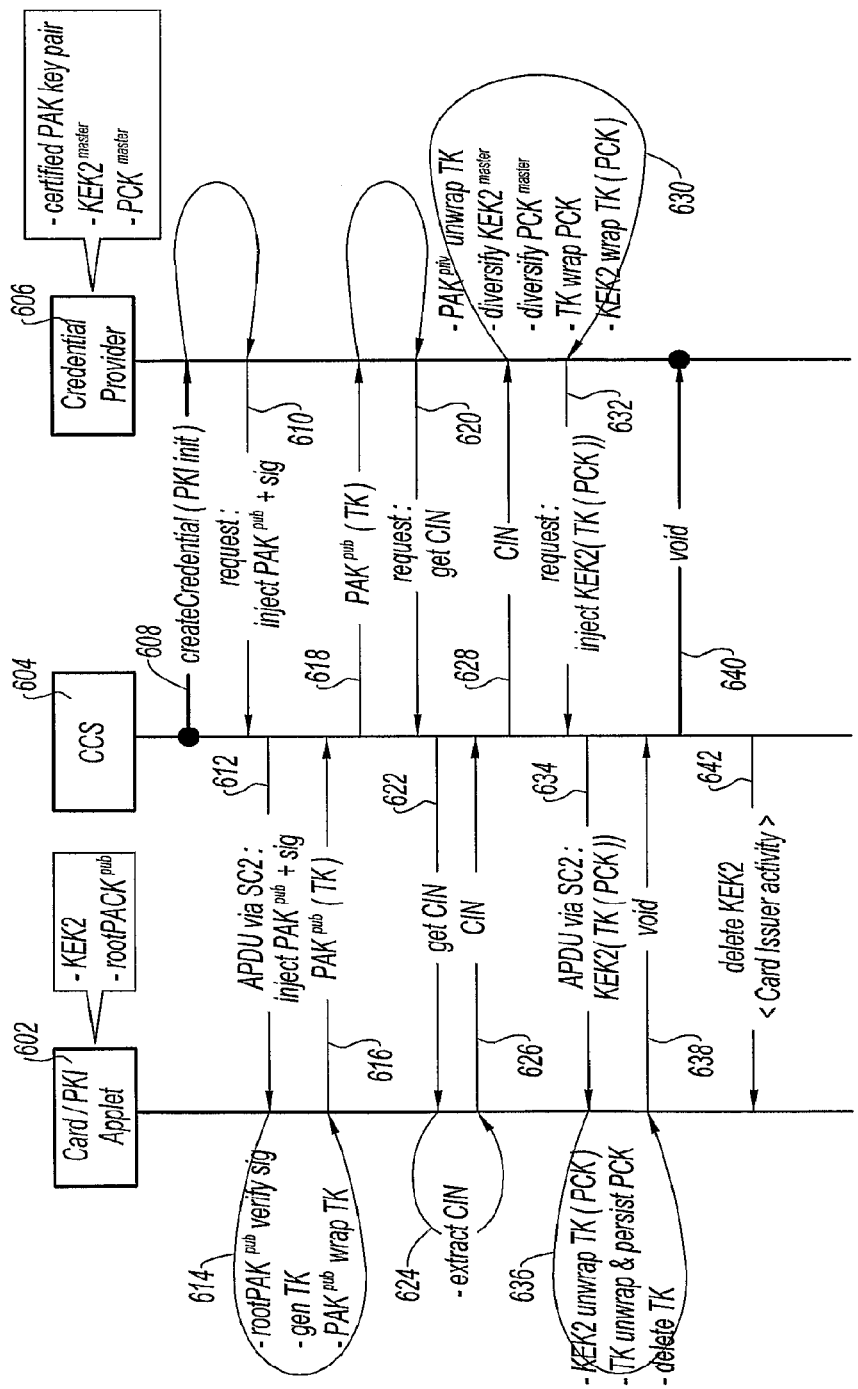
FIG. 6 illustrates a communication protocol for obtaining assurance by a content provider that a content control key is securely stored in a remote security module according to a first preferred embodiment of the invention.

FIG. 6 illustrates a communication protocol for obtaining assurance by a content provider 606 that a content control key PCK is securely stored in a remote security module 602 for further secure communications between said content provider and said security module. According to this communication protocol, the content provider 606 exchanges messages with the security module 602 through a security module communication manager (CCS) 604.

Initially, the security module communication manager 604 sends a Create Credential (PKI Init) message 608 to the content provider 606. In response, the content provider 606 issues a Request: Inject $PAK^{pub}$+Sig message 610 to the security module communication manager 604 containing a public key (PAK$^{pub}$), of an asymmetric key pair (PAK), and a digital signature (designated as Sig) of the content provider 606. The security module communication manager 604 sends an application protocol data unit (APDU) message 612 containing the received Inject PAK$^{pub}$+Sig through a secure channel (designated as SC2) to the security module 602.

In process 614, the security module 602 uses a stored rootPAK$^{pub}$ key to verify the signature Sig, accompanying the received PAK$^{pub}$, generates a session key TK if the signature is valid and wraps the generated TK with the received PAK$^{pub}$. The security module 602 sends the wrapped session key, PAK$^{pub}$(TK) in a message 616 to the security module communication manager 604, which conveys the wrapped session key to the content provider 606 in a message 618.

If the wrapped session key TK is not sent with an identifier CIN of the secure module 602, then in process 620, the content provider 606 sends a request: get CIN to the security module communication manager 604, for getting a unique identifier CIN of the security module 602. This request is transmitted 622 by the security module communication manager 604 to the security module 602. Then the security module 602 extracts 624 said unique identifier CIN and sends it 626 to the security module communication manager 604 which transmits it 628 to the content provider 606.

In process 630, the content provider 606 unwraps the received PAK$^{pub}$(TK) using a private key PAK$^{priv}$ of the asymmetric key pair PAK to obtain the decrypted TK, diversifies a stored copy of a master PCK key, masterPCK, to obtain a content control key PCK, wraps PCK with the decrypted TK to produce TK(PCK), and wraps TK(PCK) with a stored master key encryption key (designated as KEK2 and also called symmetric transport key) to produce KEK2 (TK(PCK)). The content provider 606 sends a Request: Inject KEK2(TK(PCK)) message 632 containing the doubly wrapped KEK2(TK(PCK)) to the security module communication manager 604, which conveys KEK2(TK(PCK)) to the security module 602 in an APDU message 634 via the secure channel SC2.

In process 636, the security module 602 uses its copy of the symmetric transport key KEK2 to unwrap the received KEK2 (TK(PCK)) and produce the decrypted TK(PCK), uses the TK it generated previously to unwrap and persist the decrypted TK(PCK) to obtain the decrypted PCK, and deletes the generated TK from its memory. The security module 602 sends a Void message 638 to the security module communication manager 604, which conveys a Void message 6400, in response thereto, to the content provider 606 and responds to the security module 602 with a Delete KEK2 message 642. The security module 602 deletes KEK2 upon receiving message 642 and retains the decrypted PCK received from the content provider 606 via the security module communication manager 604, for further secure communications with the content provider.

Figure 7:
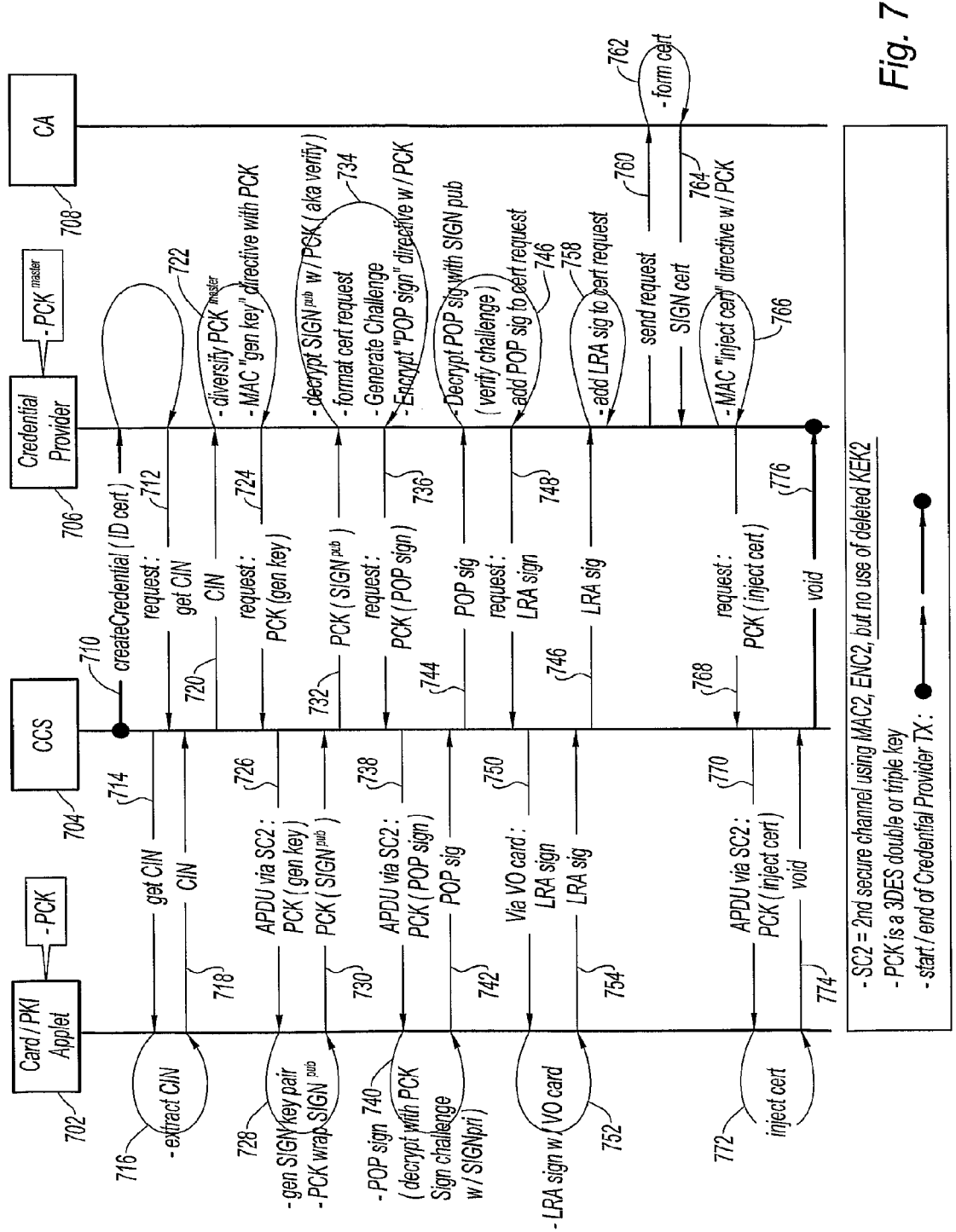
FIG. 7 illustrates a communication protocol for obtaining assurance by a content provider that a content control key is securely stored in a remote security module according to a second preferred embodiment of the invention.

FIG. 7 illustrates another embodiment of a communication protocol for obtaining assurance by a content provider 706 that a content control key SIGN$^{Pri}$ is securely stored in a remote security module 702 for further secure communications between said content provider and said security module. According to this communication protocol also, the content provider 706 exchanges messages with the security module 702 through a security module communication manager (CCS) 704. In this embodiment, the content control key SIGN$^{Pri}$ is a private key of an asymmetric key pair, wherein the corresponding public key of said asymmetric key pair is transmitted to said content provider 706.

In this figure and the following ones PCK no more designates a content control key but a symmetric transport key shared by the content provider and the security module.

Initially, the security module communication manager 704 sends a Create Credential (ID Cert) message 710 to the content provider 706. In response 712, the content provider 706 sends a request: get CIN to the security module communication manager 704, for getting a unique identifier CIN of the security module 702. This request is transmitted 714 by the security module communication manager 704 to the security module 702. Then the security module 702 extracts 716 said unique identifier CIN and sends it 718 to the security module communication manager 704 which transmits it 720 to the content provider 706.

In response 722, the content provider 706 diversifies a stored master provider credential key (masterPCK) to generate the symmetric transport key PCK shared with the security module, creates a MAC "Gen Key" Directive, and wraps the Gen Key directive with PCK to produce PCK(Gen Key). The content provider 706 issues a Request: PCK(Gen Key) message 724 containing PCK(Gen Key) to the security module communication manager 704. The security module communication manager 704 sends an application protocol data unit (APDU) message 726 containing the received PCK(Gen Key) through a secure channel (designated as SC2) to the security module 702.

In process 728, the security module 702 unwraps the received PCK(Gen Key) with its own copy of the symmetric transport key PCK, generates a signing (designated SIGN) key pair, stores the corresponding private key SIGN$^{Pri}$ which is the content control key, and wraps a public key, SIGN$^{pub}$, of the SIGN key pair with PCK to produce PCK(SIGN$^{pub}$). The security module 702 sends PCK(SIGN$^{pub}$) to the security module communication manager 704 in a PCK(SIGN$^{pub}$) message 730, and the security module communication manager 704 conveys PCK(SIGN$^{pub}$) to the content provider 706 in a PCK(SIGN$^{pub}$) message 732.

In process 734, the content provider 706 unwraps the received PCK(SIGN$^{pub}$) with its own PCK and formats a certificate (Cert) request. Then the content provider 706 generates a challenge "POP sign" directive and wraps it with the symmetric transport key PCK, thus forming a PCK(POP sign) request.

Thereafter, the content provider 706 sends 736 the PCK (POP sign) request to the security module communication manager 704, which then sends 738 the PCK(POP sign) request to the security module 702.

The security module 702 unwraps 740 the PCK(POP sign) request, signs the challenge with the content control key SIGN$^{Pri}$, provides the requested POP Sig in a POP Sig message 742 to the security module communication manager 704, which passes POP Sig in a POP Sig message 744 to the content provider 706. The content provider 706 verifies 746 the received POP Sig with SIGN$^{Pub}$ and adds it to a certificate request.

The content provider 706 sends a Request LRA Sign message 748 to the security module communication manager 704. The security module communication manager 704 then sends a Request LRA Sign message 750 to the security module 702 via VO card. The security module 702 obtains 752 the requested local registration authority (LRA) Sign and, thanks to the VO card, provides this information in an LRA Sig message 754 to the security module communication manager 704, which conveys the received LRA Sig to the content provider 706 in an LRA Sig message 756. The content provider 706 adds 758 the received LRA Sig to the certificate request.

The content provider 706 issues to a certification authority (CA) 708 a Send Request message 760 containing the decrypted $SIGN^{pub}$ and a certificate request. In process 762, the CA 708 forms a signing certificate (designated as SIGN Cert), encrypts Sign Cert with the received $SIGN^{pub}$ to produce $SIGN^{pub}(Cert)$, and sends $SIGN^{pub}(Cert)$ to the content provider 706 in a SIGN Cert message 764. Upon receiving $SIGN^{pub}(Cert)$, the content provider 706 creates 766 a MAC Inject Cert Directive by wrapping the received $SIGN^{pub}(Cert)$ with its copy of PCK to create $PCK(SIGN^{pub}(Cert))$.

The content provider sends the created $PCK(SIGN^{pub}(Cert))$ in a message 768 to the security module communication manager 704. The security module communication manager 704 sends an application protocol data unit (APDU) message 770 containing the received $PCK(SIGN^{pub}(Cert))$ through SC2 to the security module 702. The security module 702 unwraps 772 the received $PCK(SIGN^{pub}(Cert))$ with its copy of PCK to obtain $SIGN^{pub}(Cert)$ and unwraps the decrypted $SIGN^{pub}(Cert)$ with the private SIGN key, $SIGN^{priv}$, of the generated SIGN key pair to obtain the decrypted Cert. Then the security module 702 sends a Void message 774 to the security module communication manager 704, which sends it 776 to the content provider 706.

Figure 8:
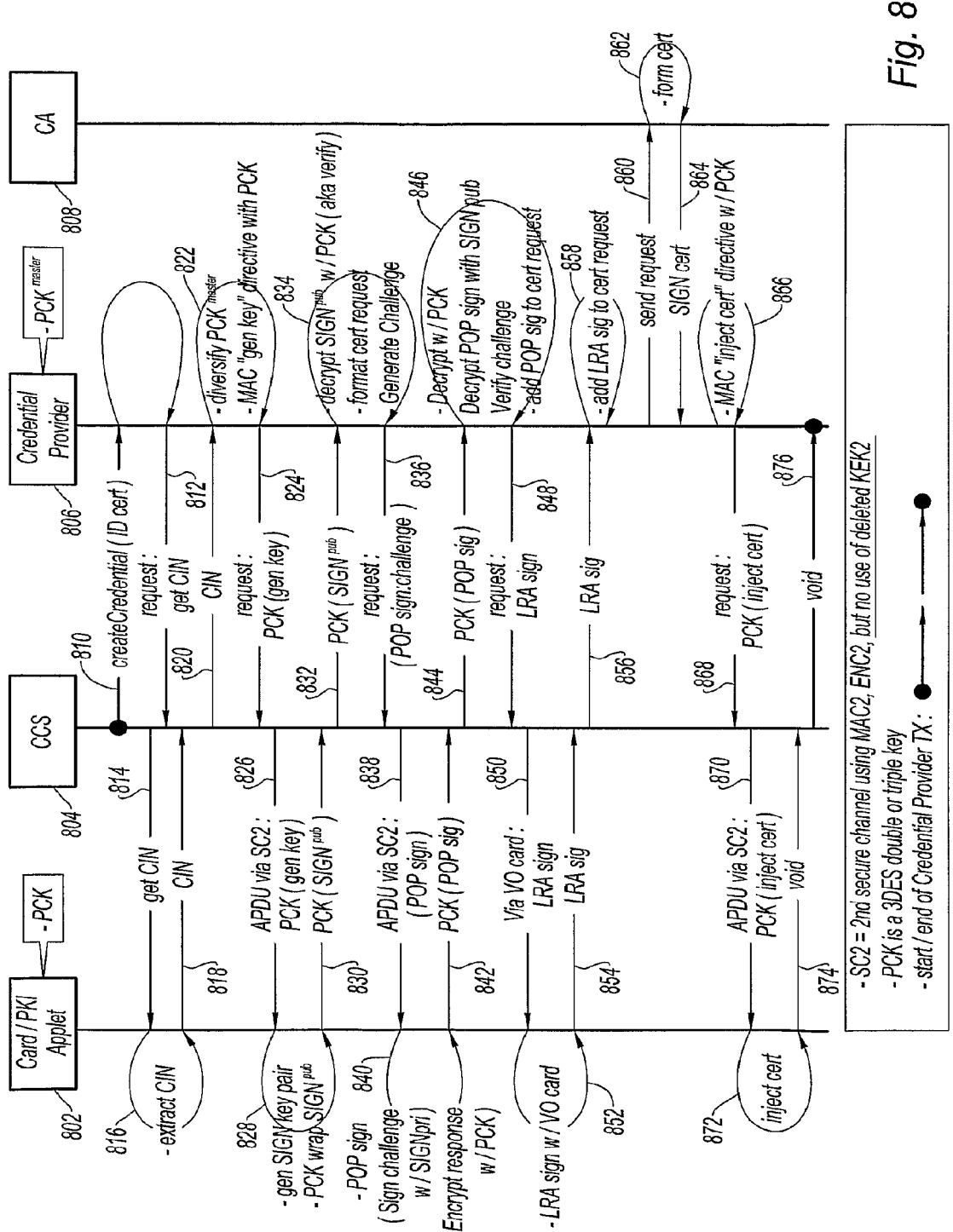
FIG. 8 illustrates a communication protocol for obtaining assurance by a content provider that a content control key is securely stored in a remote security module according to a third preferred embodiment of the invention.

FIG. 8 illustrates another embodiment of a communication protocol for obtaining assurance by a content provider 806 that a content control key $SIGN^{Pri}$ is securely stored in a remote security module 802 for further secure communications between said content provider and said security module. According to this communication protocol also, the content provider 806 exchanges messages with the security module 802 through a security module communication manager (CCS) 804. In this embodiment also, the content control key $SIGN^{Pri}$ is a private key of an asymmetric key pair, wherein the corresponding public key of said asymmetric key pair is transmitted to said content provider 806.

Initially, the security module communication manager 804 sends a Create Credential (ID Cert) message 810 to the content provider 806. In response 812, the content provider 806 sends a request: get CIN to the security module communication manager 804, for getting a unique identifier CIN of the security module 802. This request is transmitted 814 by the security module communication manager 804 to the security module 802. Then the security module 802 extracts 816 said unique identifier CIN and sends it 818 to the security module communication manager 804 which transmits it 820 to the content provider 806.

In response 822, the content provider 806 diversifies a stored master provider credential key (masterPCK) to generate the symmetric transport key PCK shared with the security module, creates a MAC "Gen Key" Directive, and wraps the Gen Key directive with PCK to produce PCK(Gen Key). The content provider 806 issues a Request: PCK(Gen Key) message 824 containing PCK(Gen Key) to the security module communication manager 804. The security module communication manager 804 sends an application protocol data unit (APDU) message 826 containing the received PCK(Gen Key) through a secure channel (designated as SC2) to the security module 802.

In process 828, the security module 802 unwraps the received PCK(Gen Key) with its own copy of the symmetric transport key PCK, generates a signing (designated SIGN) key pair, stores the corresponding private key $SIGN^{Pri}$ which is the content control key, and wraps a public key, $SIGN^{pub}$, of the SIGN key pair with PCK to produce $PCK(SIGN^{pub})$. The security module 802 sends $PCK(SIGN^{pub})$ to the security module communication manager 804 in a $PCK(SIGN^{pub})$ message 830, and the security module communication manager 804 conveys $PCK(SIGN^{pub})$ to the content provider 806 in a $PCK(SIGN^{pub})$ message 832.

In process 834, the content provider 706 unwraps the received $PCK(SIGN^{pub})$ with its own PCK and formats a certificate (Cert) request. Then the content provider 706 generates a challenge "POP sign" directive thus forming a POP sign request.

Thereafter, the content provider 806 sends 836 the POP sign request to the security module communication manager 804, which then sends 838 the POP sign request to the security module 802.

The security module 802 receives 840 the POP sign request, signs the challenge with the content control key $SIGN^{Pri}$, wraps the obtained POP Sig with PCK and provides the requested POP Sig in a PCK(POP Sig) message 842 to the security module communication manager 804, which passes the PCK(POP Sig) message 844 to the content provider 806.

The content provider 806 unwraps 846 the PCK(POP Sig) message with PCK, verifies the received POP Sig with $SIGN^{Pub}$ and adds it to a certificate request.

The content provider 806 sends a Request LRA Sign message 848 to the security module communication manager 804. The security module communication manager 804 then sends a Request LRA Sign message 850 to the security module 802 via VO card. The security module 802 obtains 852 the requested local registration authority (LRA) Sign and, thanks to the VO card, provides this information in an LRA Sig message 854 to the security module communication manager 804, which conveys the received LRA Sig to the content provider 806 in an LRA Sig message 856. The content provider 806 adds 858 the received LRA Sig to the certificate request.

The content provider 806 issues to a certification authority (CA) 808 a Send Request message 860 containing the decrypted $SIGN^{pub}$ and a certificate request. In process 862, the CA 808 forms a signing certificate (designated as SIGN Cert), encrypts Sign Cert with the received $SIGN^{pub}$ to produce $SIGN^{pub}(Cert)$, and sends $SIGN^{pub}(Cert)$ to the content provider 806 in a SIGN Cert message 864. Upon receiving $SIGN^{pub}(Cert)$, the content provider 806 creates 866 a MAC Inject Cert Directive by wrapping the received $SIGN^{pub}(Cert)$ with its copy of PCK to create $PCK(SIGN^{pub}(Cert))$.

The content provider sends the created $PCK(SIGN^{pub}(Cert))$ in a message 868 to the security module communication manager 804. The security module communication manager 804 sends an application protocol data unit (APDU) message 870 containing the received $PCK(SIGN^{pub}(Cert))$ through SC2 to the security module 802. The security module 802 unwraps 872 the received $PCK(SIGN^{pub}(Cert))$ with its copy of PCK to obtain $SIGN^{pub}(Cert)$ and unwraps the decrypted $SIGN^{pub}(Cert)$ with the private SIGN key, $SIGN^{priv}$, of the generated SIGN key pair to obtain the decrypted Cert. Then the security module 802 sends a Void message 874 to the security module communication manager 804, which sends it 876 to the content provider 806.

As embodiments of FIGS. 7 and 8 are concerned, the content provider may authenticate to the security module during the exchange of messages between the content provider and the security module. The communication protocol is thus changed, as shown on FIG. 9.

Figure 9:
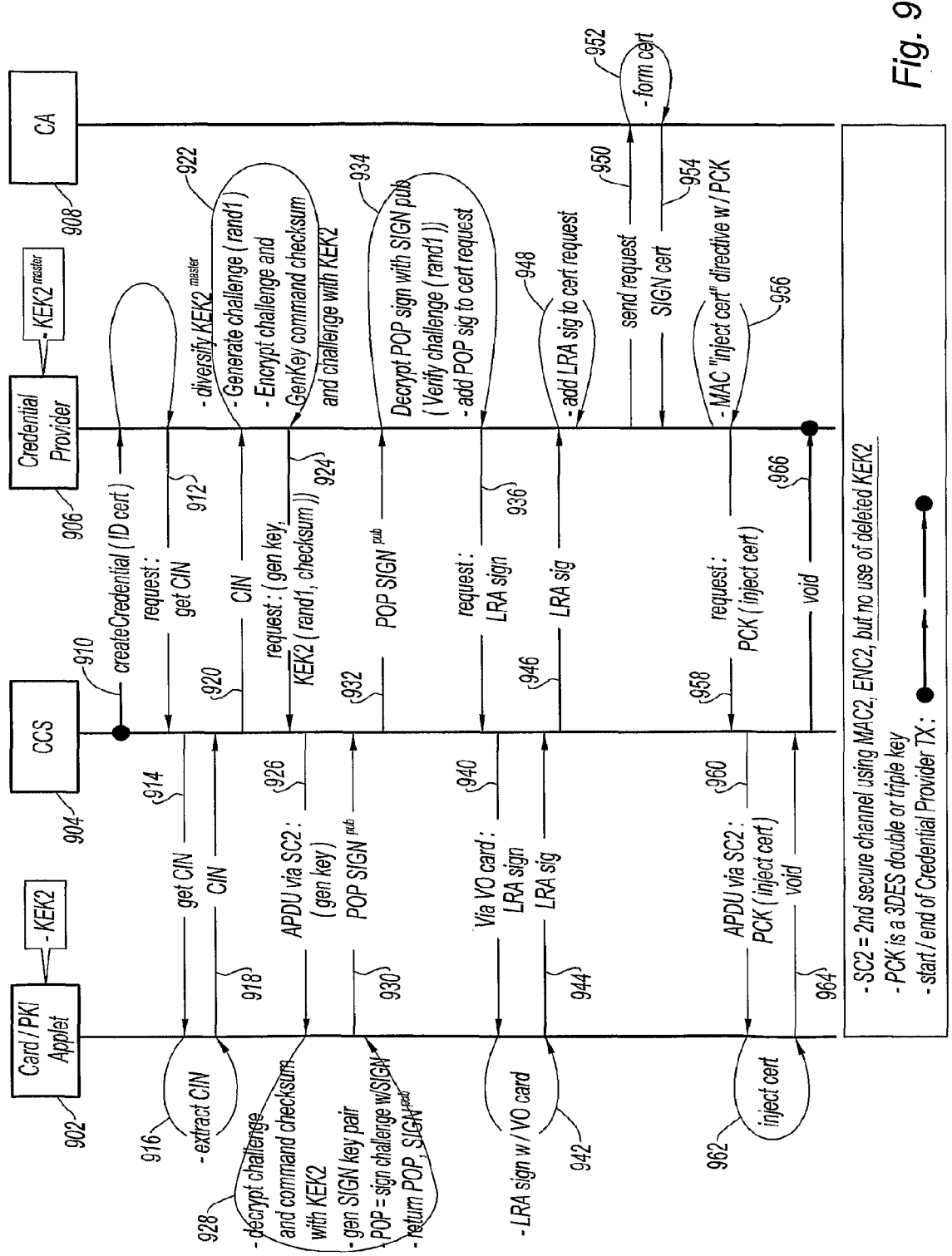
FIG. 9 illustrates a communication protocol for obtaining assurance by a content provider that a content control key is securely stored in a remote security module according to a fourth preferred embodiment of the invention.

Indeed FIG. 9 illustrates another embodiment of a communication protocol for obtaining assurance by a content provider 906 that a content control key $SIGN^{Pri}$ is securely stored in a remote security module 902 for further secure communications between said content provider and said security module. According to this communication protocol also, the content provider 906 exchanges messages with the security module 902 through a security module communication manager (CCS) 904. In, this embodiment, the content control key SIGN$^{Pri}$ is a private key of an asymmetric key pair, wherein the corresponding public key of said asymmetric key pair is transmitted to said content provider 906.

Initially, the security module communication manager 904 sends a Create Credential (ID Cert) message 910 to the content provider 906. In response 912, the content provider 706 sends a request: get CIN to the security module communication manager 904, for getting a unique identifier CIN of the security module 902. This request is transmitted 914 by the security module communication manager 904 to the security module 902. Then the security module 902 extracts 916 said unique identifier CIN and sends it 918 to the security module communication manager 904 which transmits it 920 to the content provider 906.

In response 922, the content provider 906 diversifies a stored master provider credential key (masterKEK2) to generate the symmetric transport key KEK2 shared with the security module 902, generates a challenge (rand1) and sends a gen key request with a wrapped (with KEK2) challenge and checksum, thus producing a (gen key, KEK2(rand1, checksum)) request. The content provider 906 issues a Request: (gen key, KEK2(rand1, checksum)) message 924 to the security module communication manager 904. The security module communication manager 904 sends an application protocol data unit (APDU) message 926 containing the received request through a secure channel (designated as SC2) to the security module 902.

In process 928, the security module 902 unwraps the received request with its own copy of the symmetric transport key KEK2, therefore decrypting the challenge and the command checksum. If the unwrapping succeeds, it then generates a signing (designated SIGN) key pair, stores the corresponding private key SIGN$^{Pri}$ which is the content control key, and sends 930 a public key, SIGN$^{pub}$, to the security module communication manager 904 with a response POP to the challenge, wherein the response is the challenge signed with SIGN$^{Pri}$. The security module communication manager 904 conveys the message containing POP and SIGN$^{pub}$ to the content provider 906 in a message 932.

In process 934, the content provider 906 unwraps the received POP with SIGN$^{pub}$ (i.e. it verifies the challenge rand1) and adds it to a certificate request.

The content provider 906 sends a Request LRA Sign message 936 to the security module communication manager 904. The security module communication manager 904 then sends a Request LRA Sign message 940 to the security module 902 via VO card. The security module 902 obtains 942 the requested local registration authority (LRA) Sign and, thanks to the VO card, provides this information in an LRA Sig message 944 to the security module communication manager 904, which conveys the received LRA Sig to the content provider 906 in an LRA Sig message 946. The content provider 906 adds 948 the received LRA Sig to the certificate request.

The content provider 906 issues to a certification authority (CA) 908 a Send Request message 950 containing the decrypted SIGN$^{pub}$ and a certificate request. In process 952, the CA 908 forms a signing certificate (designated as SIGN Cert), encrypts Sign Cert with the received SIGN$^{pub}$ to produce SIGN$^{pub}$(Cert), and sends SIGN$^{pub}$(Cert) to the content provider 906 in a SIGN Cert message 954. Upon receiving SIGN$^{pub}$(Cert), the content provider 906 creates 956 a MAC Inject Cert Directive by wrapping the received SIGN$^{pub}$(Cert) with its copy of PCK to create PCK(SIGN$^{pub}$(Cert)).

The content provider sends the created PCK(SIGN$^{pub}$(Cert)) in a message 958 to the security module communication manager 904. The security module communication manager 904 sends an application protocol data unit (APDU) message 960 containing the received PCK(SIGN$^{pub}$(Cert)) through SC2 to the security module 902. The security module 902 unwraps 962 the received PCK(SIGN$^{pub}$(Cert)) with its copy of PCK to obtain SIGN$^{pub}$(Cert) and unwraps the decrypted SIGN$^{pub}$(Cert) with the private SIGN key, SIGN$^{priv}$, of the generated SIGN key pair to obtain the decrypted Cert. Then the security module 902 sends a Void message 964 to the security module communication manager 904, which sends it 966 to the content provider 906.

As may be discerned from the discussion above, the invention allows a content provider to import a content provider control key in a security module capable of cryptography while requiring limited trust in other organizations and systems in charge of the production and administration of the security module. Specifically, the invention gives high confidence to the content provider that no single party involved in the trust chain and cryptographic exchange can access the content provider control key while it is being transmitted to the security module, and subsequently.

Access or knowledge of the production entity keys or access to the communication with the cards from administration entities other than the content provider does not allow those entities to easily discover the content provider control keys through theft or negligence from their employees or facilities. There is a high assurance for the content provider that the content provider control key is actually residing in a security module with the protective strength provided by that security module.

The invention is lightweight and cost effective and may be used with existing card production and management systems. It does not require an additional third party authority to act as key management, authorization, or underwriting broker for the content provider. The MULTOS model would require this additional third party.

In the case of a PKI, the invention can be leveraged to allow a CA to import a symmetric or asymmetric control key on the card or ensure that a signing key has actually been generated on a device. This key will secure any further transaction between the CA and the card, thus giving high confidence that no other party can access the PKI key material stored on the card.

More generally, in the case of identity management systems, the private biometric, identity information, or identity key material can be securely protected by the identity content provider without risk of fraud or negligence from other entities involved in the production or delivery of the security device.

The foregoing description illustrates and describes preferred embodiments of the invention, but it is to be understood that the invention is capable of use in various other combinations, modifications, and environments. In particular, it is contemplated that the functional implementation of the invention described herein may be implemented equivalently in hardware, software, firmware, and/or other available functional components or building blocks.

What is claimed is:

1. Computer software, provided in a non-transitory computer-readable medium, that obtains assurance by a content provider that a content control key is securely stored in a remote security module for further secure communications between the content provider and the security module, the software comprising:

executable code that shares the symmetric transport key with a security module manufacturer that has a pre-established trustful relation with the security module and that imports a symmetric transport key into the security module, wherein the symmetric transport key is unique to the security module; and executable code that exchanges messages with the security module through a security module communication manager in order to get proof that the security module stores the content control key, wherein at least a portion of the messages exchanged between the content provider and the security module are protected using the symmetric transport key and wherein the symmetric transport key is independent of the content control key.

2. The computer software provided in a non-transitory computer-readable medium of claim 1, wherein said content provider stores the content control key, wherein a public key of an asymmetric key pair is transmitted to the security module, the corresponding private key of the asymmetric key pair being exclusively known by the content provider, and wherein the exchange of messages between the content provider and the security module includes the security module generating a session key, wrapping the session key with the public key and transmitting the wrapped session key to the content provider, the content provider receiving and unwrapping the session key using the private key, and the content provider doubly wrapping the content control key with the session key and the symmetric transport key, and transmitting the doubly wrapped content control key to the security module.

3. The computer software provided in a non-transitory computer-readable medium of claim 2, wherein the exchange of messages between the content provider and the security module includes the content provider transmitting the public key to the security module along with a digital signature and the security module verifying with the public key whether the digital signature was derived from the private key.

4. The computer software provided in a non-transitory computer-readable medium of claim 2, wherein the content control key is a secret symmetric key.

5. The computer software provided in a non-transitory computer-readable medium of claim 2, wherein the content control key is a private key of an asymmetric key pair, the corresponding public key of which is known by the content provider.

6. The computer software provided in a non-transitory computer-readable medium of claim 1, wherein the security module generates the content control key, wherein the content control key is a private key of an asymmetric key pair, wherein the corresponding public key of the asymmetric key pair is transmitted to the content provider, and wherein the exchange of messages between the content provider and the security module includes the content provider generating a challenge and transmitting it to the security module, the security module signing the challenge with the content control key, wrapping the signed challenge with the symmetric transport key and transmitting the wrapped signed challenge to the content provider, and the content provider unwrapping and verifying the wrapped signed challenge using the public key and the symmetric transport key thus proving that the content control key is stored in the security module.

7. The computer software provided in a non-transitory computer-readable medium of claim 1, wherein the security module generates the content control key, wherein the content control key is a private key of an asymmetric key pair, wherein the corresponding public key of the asymmetric key pair is transmitted to the content provider, and wherein the exchange of messages between the content provider and the security module includes the content provider generating a challenge, wrapping the challenge with the symmetric transport key and transmitting the wrapped challenge to the security module, the security module unwrapping the challenge using the symmetric transport key, signing the challenge with the content control key and transmitting the signed challenge to the content provider, and the content provider verifying the signed challenge using the public key thus proving that the content control key is stored in the security module.

8. The computer software provided in a non-transitory computer-readable medium of claim 6, wherein the content provider authenticates to the security module during the exchange of messages between the content provider and the security module.

9. The computer software provided in a non-transitory computer-readable medium of claim 1, wherein the security module communication manager does not have access to the symmetric transport key and the content control key.

10. The computer software provided in a non-transitory computer-readable medium of claim 1, wherein the symmetric transport key is generated using a unique identifier of the security module.

11. The computer software provided in a non-transitory computer-readable medium of claim 7, wherein the content provider authenticates to the security module during the exchange of messages between the content provider and the security module.

* * * * *